United States Patent
Jahankhani et al.

(10) Patent No.: US 10,185,755 B2
(45) Date of Patent: Jan. 22, 2019

(54) ORCHESTRATION OF DATA QUERY PROCESSING IN A DATABASE SYSTEM

(71) Applicant: Business Objects Software Limited, Dublin (IE)

(72) Inventors: Saeed Jahankhani, Vancouver (CA); David Mosimann, New Westminster (CA)

(73) Assignee: Business Objects Software Limited, Dublin (IE)

( * ) Notice: Subject to any disclaimer, the term of this patent is extended or adjusted under 35 U.S.C. 154(b) by 475 days.

(21) Appl. No.: 14/981,147

(22) Filed: Dec. 28, 2015

(65) Prior Publication Data

US 2017/0185655 A1 Jun. 29, 2017

(51) Int. Cl.
*G06F 17/30* (2006.01)

(52) U.S. Cl.
CPC .... *G06F 17/30554* (2013.01); *G06F 17/3043* (2013.01); *G06F 17/30445* (2013.01); *G06F 17/30477* (2013.01); *G06F 17/30489* (2013.01); *G06F 17/30864* (2013.01); *G06F 17/30958* (2013.01)

(58) Field of Classification Search
CPC ......... G06F 17/30979; G06F 17/30864; G06F 17/30533; G06F 17/30592; G06F 17/30967; G06F 17/30515; G06F 17/30651; G06F 17/30958; G06F 17/30277; G06F 17/30554; G06F 17/30477; G06F 17/3043; G06F 17/30489; G06F 17/30445
See application file for complete search history.

(56) References Cited

U.S. PATENT DOCUMENTS

| | | | | |
|---|---|---|---|---|
| 6,684,207 B1* | 1/2004 | Greenfield | .......... | G06F 17/3041 |
| 7,519,582 B2* | 4/2009 | Fagin | ................ | G06F 17/30592 |
| 8,131,779 B2* | 3/2012 | Jonker | .............. | G06F 17/30017 |
| | | | | 707/811 |
| 8,700,605 B1* | 4/2014 | Carston | ............. | G06F 17/30463 |
| | | | | 707/718 |
| 9,116,953 B2* | 8/2015 | Weyerhaeuser | .. | G06F 17/30445 |
| 9,355,143 B2* | 5/2016 | Getmanets | ........ | G06F 17/30592 |
| 9,898,553 B2* | 2/2018 | Gralnick | ........... | G06F 17/30958 |
| 2003/0061209 A1* | 3/2003 | Raboczi | ............ | G06F 17/30864 |
| 2005/0010565 A1* | 1/2005 | Cushing | ............ | G06F 17/30392 |
| 2008/0046419 A1* | 2/2008 | Lee | ..................... | G06F 17/3043 |
| 2008/0215543 A1* | 9/2008 | Huang | .............. | G06F 17/30867 |
| 2010/0121868 A1* | 5/2010 | Biannic | ............. | G06F 17/30389 |
| | | | | 707/759 |

(Continued)

*Primary Examiner* — Srirama Channavajjala
(74) *Attorney, Agent, or Firm* — Fountainhead Law Group P.C.

(57) ABSTRACT

In one embodiment, a method receives a query for data in a database system and calls a plurality of engines to analyze information for the query. A calculation graph is generated from at least a portion of the plurality of engines where each of the at least a portion of the plurality of engines add a node to the calculation graph based on analyzing of the information for the query. Then, the method executes the query by calling the nodes of the calculation graph. Each node uses metadata added to the node from a respective calculation engine to perform a calculation for the node. Then, a result of the query is output based on the respective calculations performed by the nodes.

18 Claims, 7 Drawing Sheets

(56) References Cited

U.S. PATENT DOCUMENTS

| | | | |
|---|---|---|---|
| 2011/0213801 A1* | 9/2011 | He | G06F 17/30489 |
| | | | 707/770 |
| 2012/0010993 A1* | 1/2012 | Ferrara | G06Q 30/02 |
| | | | 705/14.49 |
| 2013/0073537 A1* | 3/2013 | Simon | G06F 17/30463 |
| | | | 707/714 |
| 2013/0290298 A1* | 10/2013 | Weyerhaeuser | G06F 17/30463 |
| | | | 707/719 |
| 2014/0149376 A1* | 5/2014 | Kutaragi | G06K 9/4676 |
| | | | 707/706 |
| 2014/0172914 A1* | 6/2014 | Elnikety | G06F 17/30958 |
| | | | 707/774 |
| 2014/0207802 A1* | 7/2014 | Raghavan | G06F 17/30958 |
| | | | 707/749 |
| 2014/0344245 A1* | 11/2014 | Weyerhaeuser | G06F 17/30489 |
| | | | 707/714 |
| 2014/0372365 A1* | 12/2014 | Weyerhaeuser | G06F 17/30592 |
| | | | 707/602 |

\* cited by examiner

ORCHESTRATION OF DATA QUERY PROCESSING IN A DATABASE SYSTEM

BACKGROUND

Data blending blends data from multiple data sources in a single visualization. The data blending may be different from row-level joins. Rather, data blending may be used when a user wants to view related data from multiple data sources in a single visualization. To blend the data, the data must be retrieved from the different data sources using different queries. This requires queries to the different databases. When the data is received, the database system can blend the data together in a single visualization. In some cases, performing a query that blends data from different data sources is difficult for a system to process.

SUMMARY

In one embodiment, a method receives a query for data in a database system and calls a plurality of engines to analyze information for the query. A calculation graph is generated from at least a portion of the plurality of engines where each of the at least a portion of the plurality of engines add a node to the calculation graph based on analyzing of the information for the query. Then, the method executes the query by calling the nodes of the calculation graph. Each node uses metadata added to the node from a respective calculation engine to perform a calculation for the node. Then, a result of the query is output based on the respective calculations performed by the nodes.

In one embodiment, a non-transitory computer-readable storage medium contains instructions, that when executed, control a computer system to be configured for: receiving a query for data in a database system; calling a plurality of engines to analyze information for the query; determining a calculation graph generated from at least a portion of the plurality of engines, wherein each of the at least a portion of the plurality of engines add a node to the calculation graph based on analyzing of the information for the query; executing the query by calling the nodes of the calculation graph, wherein each node uses metadata added to the node from a respective calculation engine to perform a calculation for the node; and outputting a result of the query based on the respective calculations performed by the nodes.

In one embodiment, an apparatus includes: one or more computer processors; and a non-transitory computer-readable storage medium comprising instructions, that when executed, control the one or more computer processors to be configured for: receiving a query for data in a database system; calling a plurality of engines to analyze information for the query; determining a calculation graph generated from at least a portion of the plurality of engines, wherein each of the at least a portion of the plurality of engines add a node to the calculation graph based on analyzing of the information for the query; executing the query by calling the nodes of the calculation graph, wherein each node uses metadata added to the node from a respective calculation engine to perform a calculation for the node; and outputting a result of the query based on the respective calculations performed by the nodes.

The following detailed description and accompanying drawings provide a better understanding of the nature and advantages of particular embodiments.

DETAILED DESCRIPTION

Described herein are techniques for a query orchestrator in a database system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide a query orchestrator that can orchestrate the processing of a query in a database system. In one embodiment, the query may be a multi-dimensional query that requires the blending of data from multiple data sources. The query orchestrator may send the query (or sub-queries) to multiple calculation engines. Each calculation engine can determine if it needs to perform a calculation to process the query. The calculation engines can create calculation nodes in a graph for each calculation that is needed. In one embodiment, each calculation engine is called in a pre-defined order to analyze the query to determine calculation nodes that are needed. For example, a first calculation engine may add a calculation node to the graph, and then a second calculation engine analyzes the query in view of the added node to determine if another calculation node should be added to the graph. This process continues until all of the calculation engines have analyzed the query, and a calculation graph is output. The calculation graph represents calculations that should be executed in a processing order.

The query orchestrator then calls an output node in the graph to process the query. For example, output node traverses the graph to the root nodes, and then the calculations for each node may be performed according to the graph. The data then flows downward in the graph to the output node as each node performs the respective calculations. It should be noted that the order of processing does not need to proceed in series and nodes can be executed in parallel based on the calculation graph. This process continues until a result set is generated. The output node can then output the result set to the client.

Figure 1:
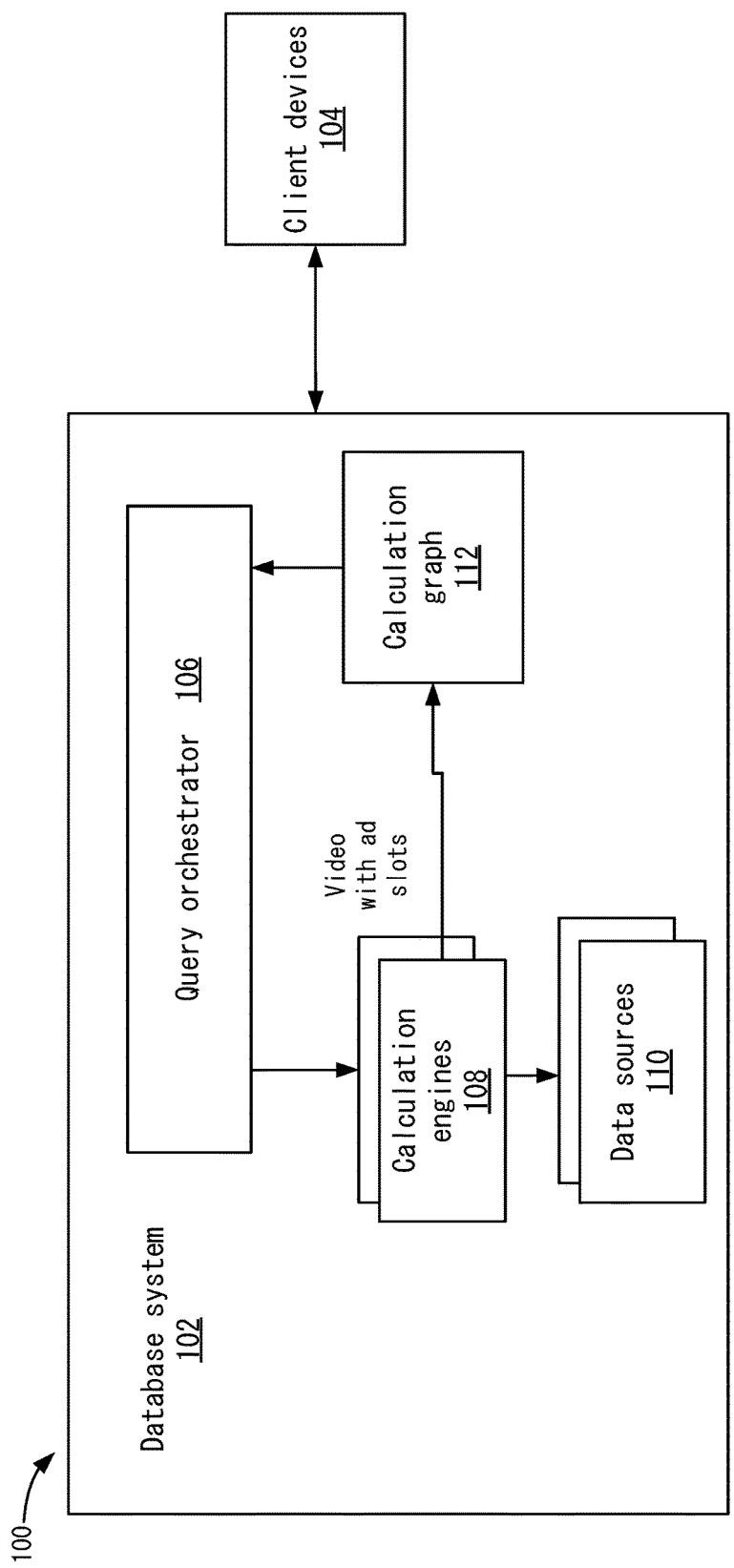
FIG. 1 depicts a simplified system for processing a query using a calculation graph according to one embodiment.

FIG. 1 depicts a simplified system 100 for processing a query using a calculation graph according to one embodiment. System 100 includes a database system 102 and a client device 104. It will be understood that database system 102 may include multiple servers and data sources. These servers and data sources may be offline or online, such as being accessible via a wide area network (e.g., the cloud), or be located locally. Also, client device 104 may include multiple client devices that send queries to database system 102.

Database system 102 includes a query orchestrator 106 and calculation engines 108, which may be implemented on database servers. Query orchestrator 106 may receive a query from client device 104 and process the query to generate a result set for client device 104. In one embodiment, the query may be a multi-dimensional query. A multi-dimensional query may query multi-dimensional data, such as data stored in cubes. Also, the query may blend data from multiple data sources 110. As discussed above, the blending may be different than data joins. Rather, the blending may blend data from different sources across dimensions.

In one example, the query includes layout information, data query information, and synchronization information. The layout information specifies one or more categorical axis and one or more numerical axes. The categorical axis has the dimensions/levels and can be sorted by measure/dimension and direction or sort. The measure group can also have expressions defined in an AST (abstract syntax tree) format.

The data query can include one or more data sources. Each data source has a list of entities (EM_) used in the query from that data source. Also, the data query specifies filters (rank, local, global) that are used. Identifiers (IDs) that can also be used are:
  Column Id—this is the Id specified in a dataset table, which could be the smallest granular level for a column.
  Entity id—this is an Id that may be unique per dataset. This could contain columns under that, such as a level.
  Entity model Id—the model may be unique per workspace. This may be only known by the client side. On the server, there is a map that mentions the mapping between the entity model id (EM_) and the actual column id in the dataset.

The synchronization information is used to specify blending information. There can be only one primary dataset and one or more secondary dataset each mapped by one or more columns only to the primary dataset. There could also be more information in the data query for different type of expressions used in the visualization.

In one embodiment, different calculation engines 108 perform different functions in database system 102. In one embodiment, calculation engines 108 may access different data sources 110. For example, data sources may include local data sources that include offline data sources that may be local data sources 110. Remote data sources may be data sources that need to be accessed over a wide area network (WAN) connection and include online data. Local data sources 110 may be accessed over a local area network (LAN).

In addition to accessing data sources 110, calculation engines 108 may also perform other functions, such as processing sub-query results (e.g., blending results retrieved from data sources 110, performing layout of the visualization, and other functions).

Query orchestrator 106 calls calculation engines 108 in an order that may be pre-defined. Each calculation engine 108 may then analyze the query (and other data created by other calculation engines) to create calculation nodes in calculation graph 112. For example, different calculation engines 108 may determine that different calculations need to be performed to process the query and add different calculation nodes to calculation graph 112. Once all the calculation engines 108 have been called, a calculation graph 112 is output.

Using calculation graph 112, an output node may then use the calculation graph to process the query. For example, calculation graph 112 is traversed from the output node to the root nodes with each node determining its respective dependent nodes and calling those nodes until the root nodes are reached. Once a root node is reached, the root node performs its respective calculation based on metadata added to the node from the calculation engine. Then, the results are passed to any leaf nodes. This continues until the output node receives the result set. The output node then outputs the query result set in a visualization on client 104. In one example, the visualization may include data blended from multiple data sources and is presented in a single view. In other embodiments, different calculation engines 108 may create different views in the visualization.

Figure 2:
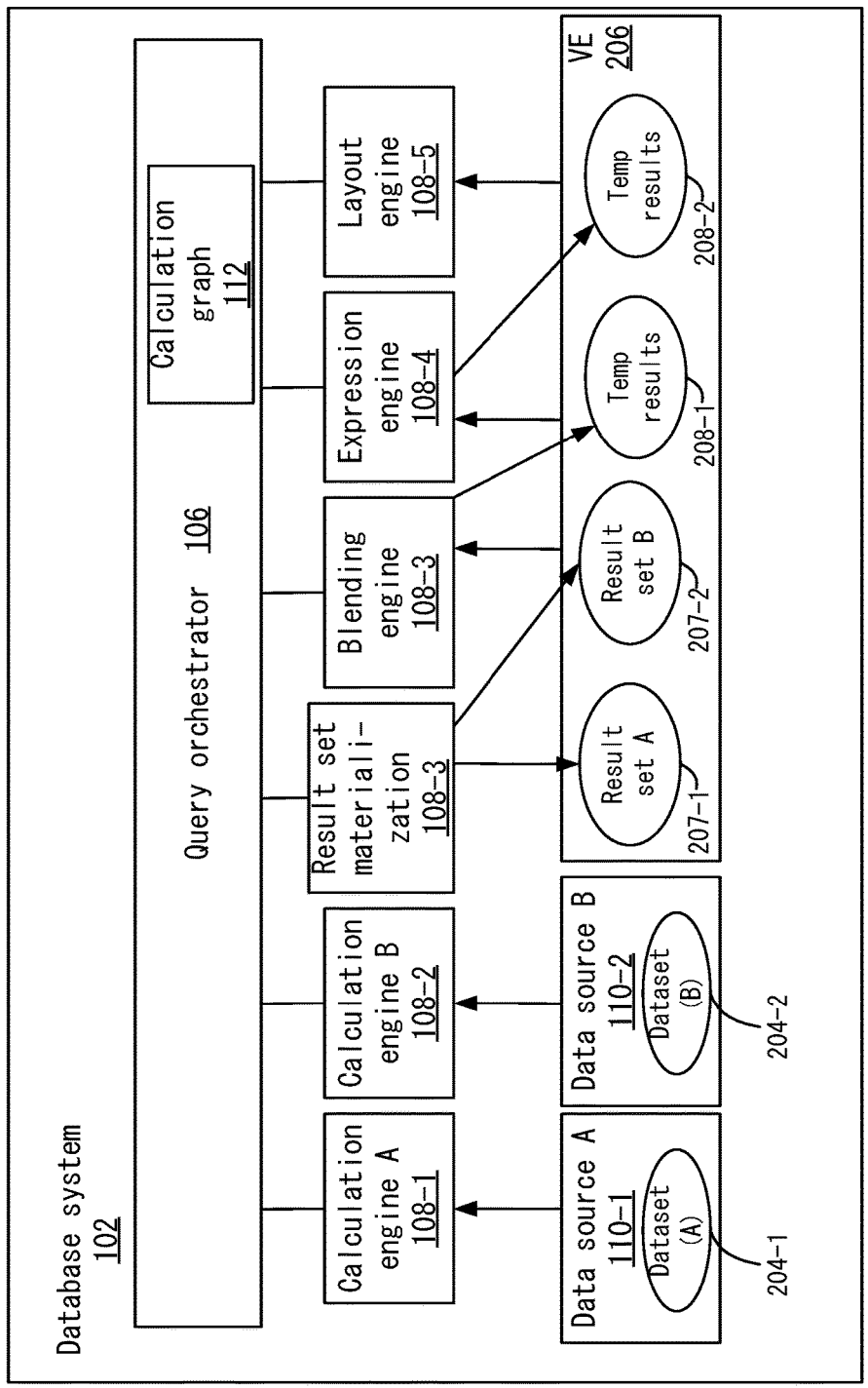
FIG. 2 depicts a more detailed example of a database system according to one embodiment.

FIG. 2 depicts a more detailed example of database system 102 according to one embodiment. This diagram shows the processing of a query for illustrative purposes. System 102 may process the query in two (or more) query phases using calculation graph 112. A first phase may include a base sub-query or other secondary sub-queries that retrieve data from underlying data sources 110. In this example, a first data source A at 110-1 and a second data source B at 110-2 are shown. Other data sources 110 may be appreciated. Query orchestrator 106 may break the original query into sub-queries for each underlying data source based on calculation graph 112. Then, query orchestrator 106 may execute each sub-query against the appropriate calculation engine 108. For example, query orchestrator 106 may send a first sub-query to calculation engine A 108-1 and a second sub-query to calculation engine B 108-2.

A second phase may include an analytic query that processes results from sub-queries. For example, the analytical query may blend the results from sub-queries and performs post-sub-query calculation steps. Various engines to perform the analytical queries are shown as a result set materializer (mat.) engine 108-3, a blending engine 108-4, an expression engine 108-5, and a layout engine 108-6. It will be recognized that other engines may be appreciated and are described in more detail below.

Calculation engine A may retrieve a first data set (A) 204-1 from data source A and calculation engine B may retrieve a second data set (B) 204-2 from data source B. For example, calculation engine A and calculation engine B may perform the sub-queries to retrieve the data sets. As mentioned above, the sub-queries may be performed against online data and/or offline data. The result set for each sub-query may be materialized in a velocity engine (VE) 206 at result set materialization 108-3 if the node was remote from the velocity engine. Velocity engine 206 may be used to perform analytical queries on result set A at 207-1 and result set B at 207-2. For example, this may include performing calculations, aggregations, and filtering. Calculations performed in velocity engine 206 do not need to be materialized because they are already in velocity engine 206. Then, query orchestrator 106 may process the result sets in velocity engine 206 to generate temporary (temp) results at 208-1. For example, query orchestrator 106 calls blending engine 108-4 to blend the result sets to produce temporary results shown at 208-1. The data blending may include blending together result sets from different sub-queries into a single visualization. This may produce a blended result set as temporary results 208-1.

Further processing of the temporary results 208-1 may also be performed. For example, query orchestrator 106 may cause expression engine 108-5 to apply table functions to temporary results 208-1 to produce temporary results 208-2. Expressions are intended to operate on aggregated data that has been produced by visualization contexts; that is, the result set data behind a visualization. Further, layout engine 108-6 may also perform other functions on temporary results 208-2. This may include layout of the characteristics as key/description, display/suppress results rows, and changing position of hierarchy nodes in temporary results 208-2. This produces a query result set that can be returned to client device 104.

A result set is created from a data set at visualization time by specifying a visualization context, which can also be thought of as a query. The result set is an aggregated view of the row level data. The result set can be considered a true set in that there are no duplicated rows—each row represents values for a unique tuple of dimension members (e.g., sales value for ["Canada", "carmaker", "2012"]. Generally, the creation of a table expression can be thought of as a creation of a new calculated column to be added to the result set.

Figure 3:
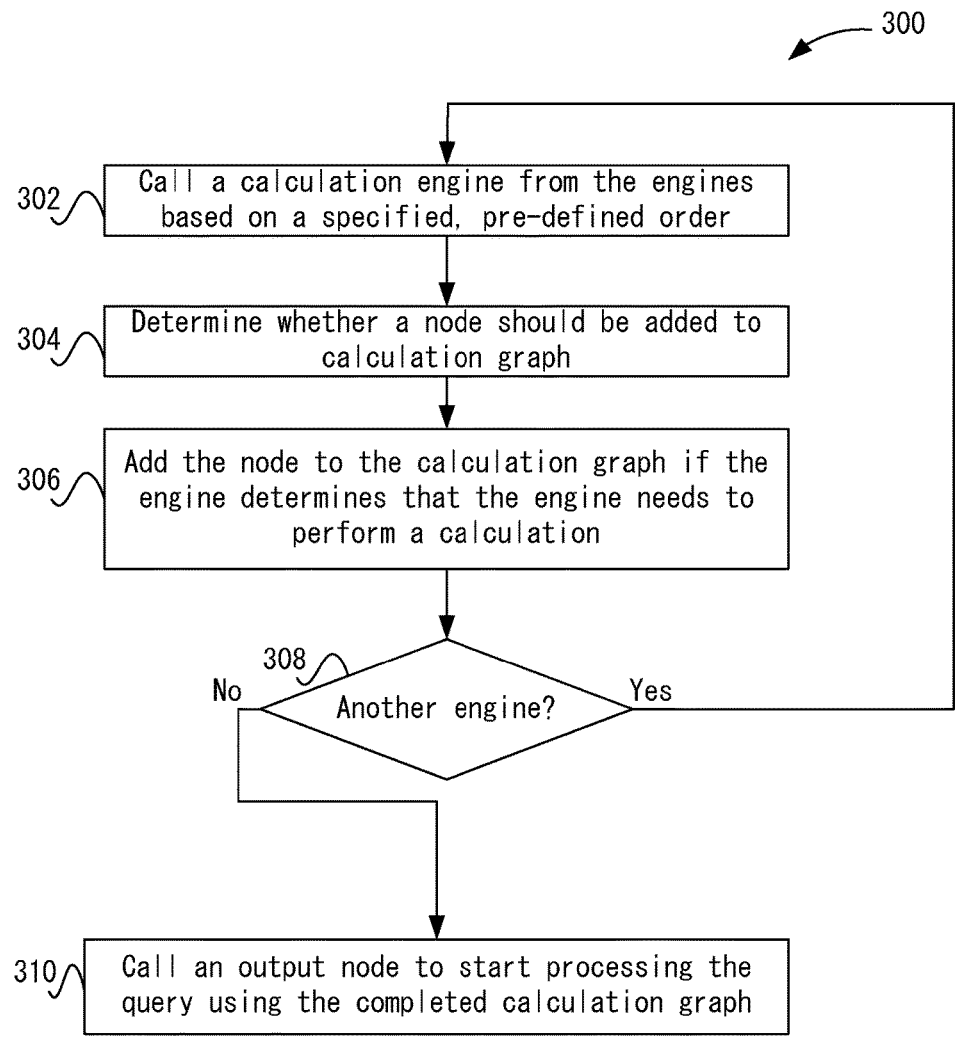
FIG. 3 depicts a simplified flowchart of a method for generating a calculation graph according to one embodiment.

To perform the above query processing, query orchestrator 106 first generates calculation graph 112. FIG. 3 depicts a simplified flowchart 300 of a method for generating calculation graph 112 according to one embodiment. At 302, query orchestrator 106 calls a calculation engine 108 from the engines based on a specified, pre-defined order. For example, the order may be as follows:

1) Perform base level filtering/aggregation per input data source
2) Blend the result sets if necessary
3) Perform secondary aggregation on blended result if necessary
4) Filter Top N records (the context can be fixed to a particular data source or on top of blend result)
5) Interpolate for missing time period if time dimension is used in query
6) Compute table calculations (Predictive or expression)
7) Transform result in layout (e.g., JavaScript Object Notation (JSON) format for client.

In one embodiment, the engines may be pre-configured to perform different calculations (e.g., aggregation, data retrieval, sorting, drill up/down, blending, etc.). A calculation may be any action that is performed to process the query. In one embodiment, calculation engines 108 include a high-low query engine/data query node, a blend engine, an aggregation engine, a rank engine, a counter engine, a joined data query engine, a counter engine null handler, a time interpolate engine, a Cartesian engine, a table calculation factory engine, and a layout engine. Other engines may also be appreciated.

The following describes possible functions that can be performed by the engines:

A data query engine may break the query up into different sub-queries. This may create multiple data query calculation nodes.

A blend engine blends multiple data sets together. The blend engine may create a blend node in calculation graph 112 for each blending operation.

An aggregation engine may perform aggregation on data sets to realize result sets. The aggregation engine may create an aggregation node in calculation graph 112.

A rank engine may rank the results. The rank engine may create a rank node in the calculation graph 112.

A counter engine may perform a count operation. The count engine adds a counter node in calculation graph 112.

A joined data query engine may perform joins of result sets. This adds a join node to calculation graph 112.

A counter engine null handler engine may handle null values. This adds a null handler node to calculation graph 112.

A time interpolate engine may perform interpolation over multiple entries over time. This adds a time interpolate node to calculation graph 112.

A Cartesian engine may produce a Cartesian product for result sets. This adds a Cartesian handler node to calculation graph 112.

A table calculation factory may generate extension points for expressions. This adds a table calculation factory node to calculation graph 112.

A layout engine may layout the result set in a visualization. Layout engine 202-4 may generate a layout node for calculation graph 112.

At 304, the calculation engine 108 that has been called determines whether a node should be added to calculation graph 112. The analysis may be different depending on the calculation engine called. At 306, the calculation engine 108 adds the node to calculation graph 112 if the engine determines that the engine needs to perform a calculation. If the calculation engine 108 does not need to perform any calculations in processing the query, then calculation engine does not add any nodes to calculation graph 112. Also, calculation engine 108 may add multiple calculation nodes for multiple calculations. When adding a node, calculation engine 108 adds metadata that can be used to perform the calculation for the node. The metadata may include instructions that can be executed.

At 308, query orchestrator 106 determines if another calculation engine 108 should be called. If so, the process reiterates to 302 where query orchestrator 106 calls another calculation engine 108.

The process proceeds to call calculation engines 108 and add calculation nodes to calculation graph 112 until all calculation engines 108 have been called. In one embodiment, each calculation engine 108 may use the results from one or more prior calculation engines 108 to determine whether another node needs to be added in calculation graph 112. For example, depending on which nodes were added in calculation graph 112, a calculation engine 108 may determine whether another calculation node needs to be added.

When no more calculation engines 108 need to be called, at 310, query orchestrator 106 calls an output node to start processing the query using the completed calculation graph 112. Calculation graph 112 is a calculation plan that is used to process the query.

Figure 4:
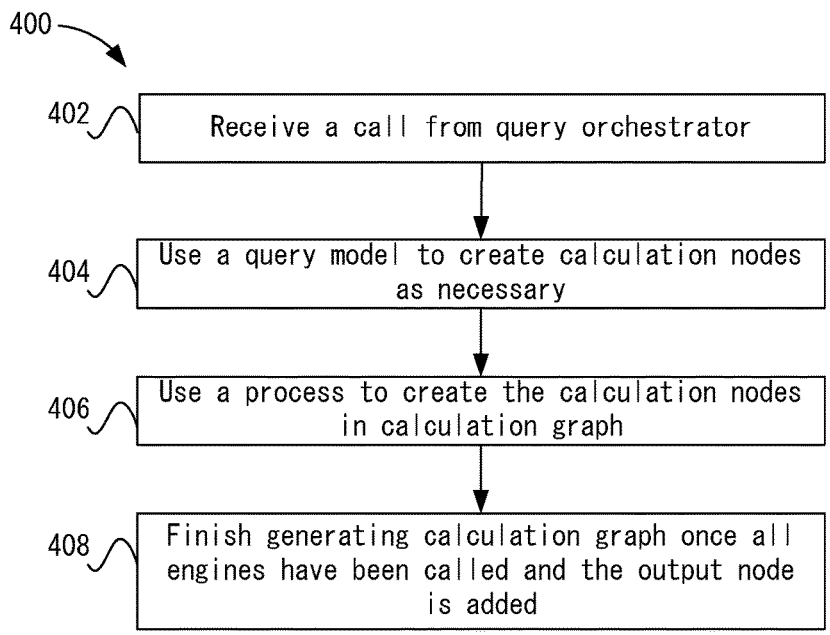
FIG. 4 depicts a simplified flowchart of a method for determining whether a calculation node should be added to the calculation graph according to one embodiment.

When an engine is called, each calculation engine 108 may determine whether a calculation node should be added. FIG. 4 depicts a simplified flowchart 400 of a method for determining whether a calculation node should be added to calculation graph 112 according to one embodiment. At 402, a calculation engine 108 receives a call from query orchestrator 106.

At 404, calculation engine 108 uses a query model to create calculation nodes as necessary. Query orchestrator 106 may have created the query model to define the query being performed. The query model may include the information described above that could be included in a query. By consulting the query model, calculation engine 108 can determine if it needs to perform any calculations to process the query. Each calculation engine 108 may use rules to determine whether to add a node. For example, if more than 1 categorical axis is in the query layout, then a Cartesian engine needs to create Cartesian product node to create cross join of tuples from each axis. If there is a synchronization block and more than 1 data source is defined, the blend engine needs to create blend/aggregate node. If there is a time level/dimension used in layout, and the axis requires time interpolation (a flag: interpolateTime), an interpolation engine will add a Time Interpolation Node. If there are calculations specified in query (either predictive, or expression), an engine will create such nodes accordingly. If there's a rank filter in the query, then a rank engine will create rank node. At the same time, some nodes always exist in graph (Data query Node, layout node, etc.). Further, calculation engine 108 may use information generated from a prior calculation engine 108 that was called, such as information including the current status of calculation graph 112 and/or any sub-queries to be performed.

At 406, calculation engine 108 then uses a process to create the calculation nodes in calculation graph 112. For example, metadata may be added to the calculation graph 112 for the node. For example, the metadata may include information defining what calculations are going to be performed for the node. The metadata may include a relation between a query column and a table column. The query column may be the design-time column ID. This could be a column in the data set or a dynamic column generated for dynamic text. A table column is the ID of the column in the output generated by the calculation node 108. Each node requires particular metadata to assist it in creating instructions for underlying database calculation (e.g., an SQL Query). For example, for time interpolation node, the information needed to perform the calculation is which column represents time. Or for rank node, the information needed to perform the calculation is at what context the specified measure needs to be executed and how its result should be used in filtering main query result (how many records to filter, from top or bottom, etc.)

At 408, the generation of calculation graph 112 is finished once all engines have been called and the output node is added.

Figure 5:
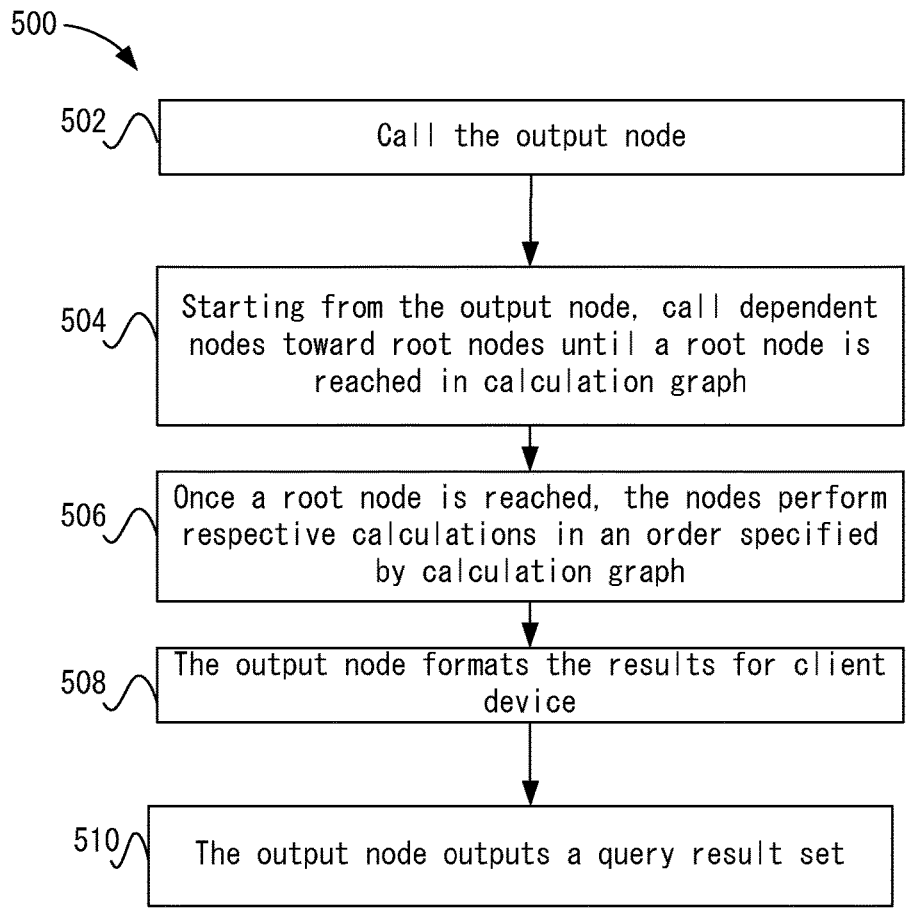
FIG. 5 depicts a simplified flowchart of a method for processing the query using the calculation graph according to one embodiment.

Once receiving the completed calculation graph 112, query orchestrator 106 can call the output node on calculation graph 112 to have the query processed. FIG. 5 depicts a simplified flowchart 500 of a method for processing the query using calculation graph 112 according to one embodiment.

At 502, the output node is called by query orchestrator 106. Then, at 504, starting from the output node, dependent nodes toward root nodes are called until a root node is reached in calculation graph 112. That is, nodes in calculation graph 112 are traversed from leaf nodes to root nodes. In one embodiment, root nodes perform queries to retrieve data from data sources, and leaf nodes process retrieved data sets.

At 506, once a root node is reached, the nodes are called to perform respective calculations in an order specified by calculation graph 112. Each node may use the metadata generated by the respective calculation engine to perform the calculation. Once finished, dependent nodes are called to perform another calculation until the output node is reached.

So the traversing goes up the calculation graph and then the calculations are performed going down the calculation graph to the output node. Each node may generate a result. The result may include a primary sub-query result and/or a secondary result. The primary result may be a result that is not joined with another result. A secondary result may be joined with another secondary result. The result may also be result set from an analytical query, such as blending. The result may be a result table that may be a table realized in velocity engine 206, a view, or a sub-query. Also, the result table may be a remote result table that was generated from offline data. Velocity engine 206 may cache the results tables created for the data query. Each calculation engine 108 may use the cached results in performing its own task.

At 508, the output node formats the results for client device 104. Finally, at 510, the output node outputs a query result set.

In one embodiment, each node may be executed in a separate thread that can be triggered synchronously or asynchronously. In one embodiment, query orchestrator 106 triggers the calculation engines asynchronously. Each calculation engine 108 may perform the calculations on its own nodes in parallel. That is, if a data analysis engine has three parent nodes that do not depend on each other, then data analysis engine may perform the analysis in parallel.

Figure 6:
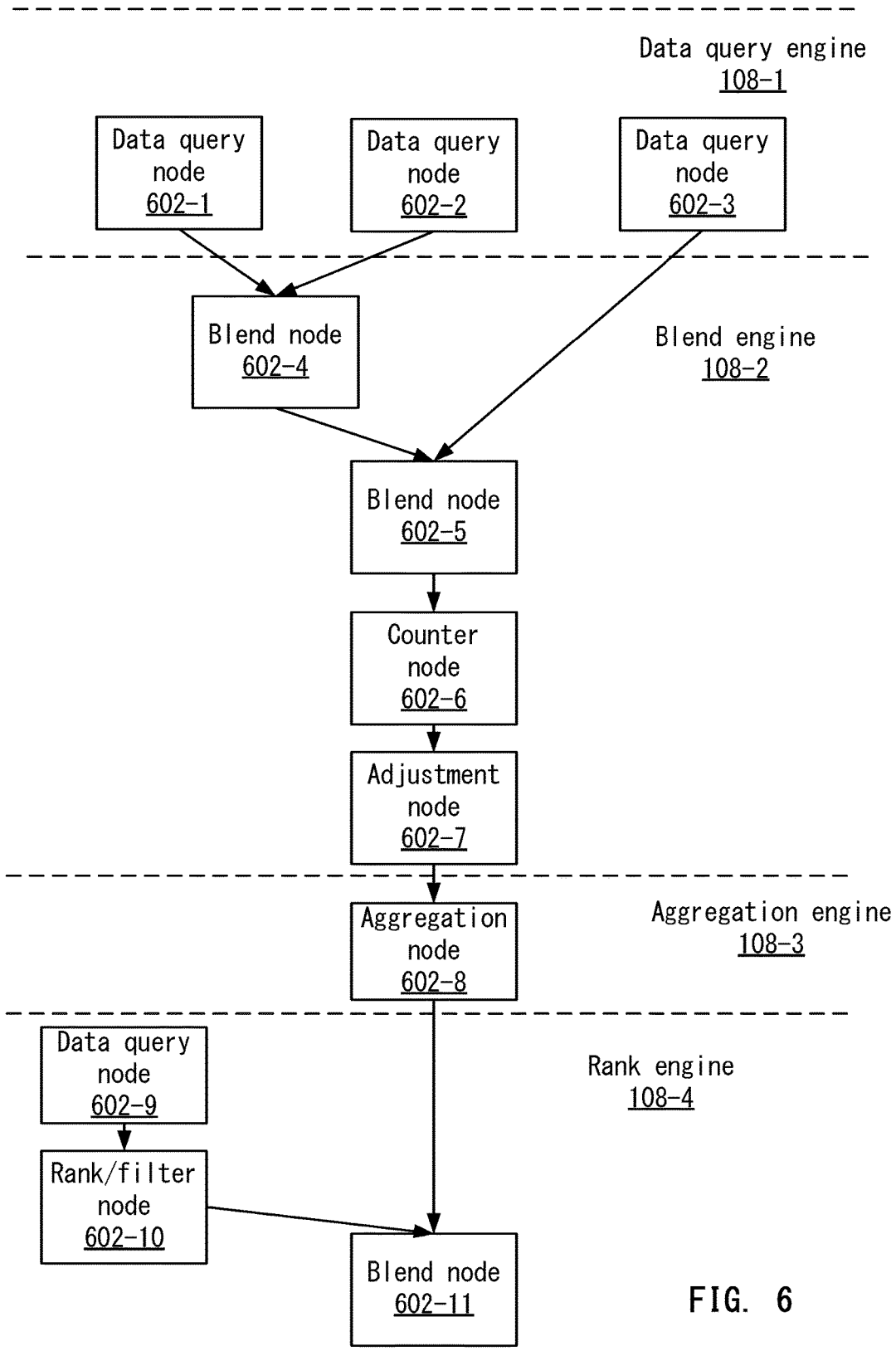
FIG. 6 depicts an example of the calculation graph according to one embodiment.

FIG. 6 depicts an example of calculation graph 112 according to one embodiment. FIG. 6 shows how calculation graph 112 is divided into sections in which different engines perform. For example, a data query engine 108-1, a blend engine 108-2, an aggregation engine 108-3, and a ranking engine 108-4 are shown.

At 602-1, 602-2, and 602-3, data query engine 108-1 creates three data query nodes. Each node may be a sub-query that needs to be performed for the main query.

After data query engine 108-1 processes the query to generate the data query nodes 602, blend engine 108-2 may process the query to determine which calculation nodes to add. For example, blend engine 108-2 adds a blend node 604-1 and a blend node 604-2. Blend node 604-1 may blend the data sets from data query node 602-1 and data query node 602-2. Also, blend node 604-2 may blend the data sets from data query node 602-3 and blend node 604-1.

Blend engine 108-2 may also add a counter node at 602-6 and an adjustment node at 602-7. The counter node may perform a count operation. Also, adjustment node 602-7 may adjust the result set.

Aggregation engine 106-3 may then analyze the query to determine calculation nodes to add. In this case, aggregation engine 106-3 adds an aggregation node at 602-8 that aggregates the results from adjustment node 602-7.

After aggregation, ranking engine 108-4 adds another data query node at 602-9. The data query node 602-9 may be another sub-query that is performed. This node is added as a root node because it involves query a data source for data. Then, ranking engine 108-4 adds a rank node at 602-10 that ranks the data set returned from data query node at 602-9. Further, ranking engine 108-4 adds a blend node 602-11 to blend the aggregated results from aggregation node 602-8 and rank node 602-10. The output of blend node 602-11 is an output node (not shown) that can output the query result set. Accordingly, calculation engines 108 have generated calculation graph 112 that may be used to orchestrate the processing of a query.

Figure 7:
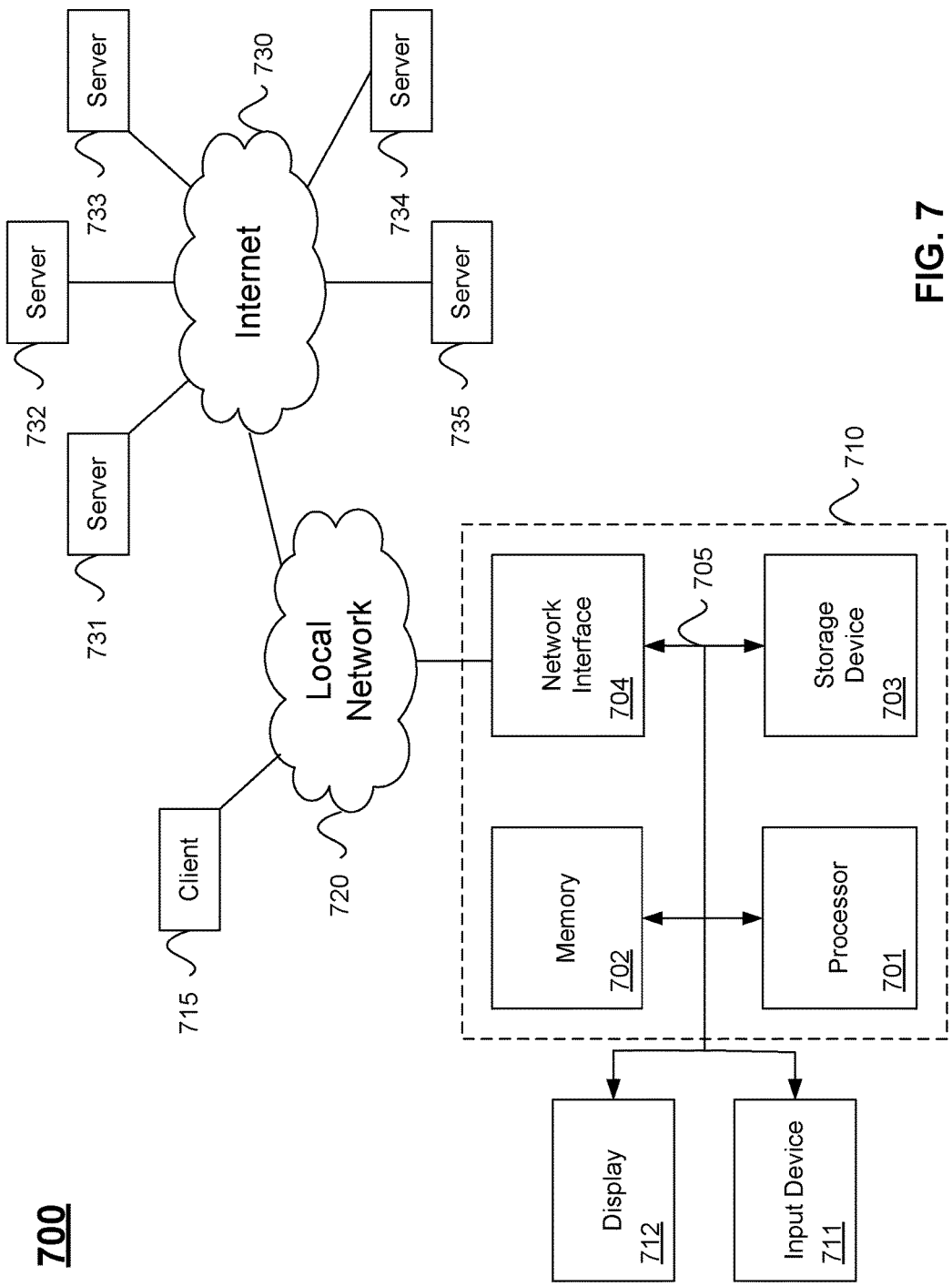
FIG. 7 illustrates hardware of a special purpose computing machine configured with a query orchestrator according to one embodiment.

FIG. 7 illustrates hardware of a special purpose computing machine configured with query orchestrator 106 according to one embodiment. An example computer system 710 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable storage mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information through the network interface 704 across a local network 720, an Intranet, or the Internet 730. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   receiving, by a computing device, a multi-dimensional query for data in a database system, the multi-dimensional query requiring blending of data from multiple data sources;
   sending, by the computing device, at least a portion of the query to each of a plurality of engines that analyze information for the query, wherein:
      at least a portion of the plurality of engines analyze the query to determine whether to add a node to a calculation graph based on a previously added node,
      at least a portion of the plurality of engines add a node to the calculation graph based on analyzing of the information for the query when it is determined that a calculation by a respective engine needs to be performed, and
      a node that is a blend node is added to the calculation graph when more than one data source is defined by other nodes;
   determining, by the computing device, the calculation graph generated from the at least a portion of the plurality of engines;
   executing, by the computing device, the query by calling the nodes of the calculation graph, wherein each node uses metadata added to the node from a respective engine to perform the calculation for the node, and wherein a blend node that is called blends data from more than one data source together when executed, and wherein executing comprises:
      calling an output node to start processing of the query;
      traversing the calculation graph from the output node to a root node, wherein when a root node is reached, the root node performs a respective calculation; and
   after the root node, any dependent nodes perform respective calculations according to an order of the calculation graph until the output node is reached; and
   outputting, by the computing device, a result of the query based on the respective calculations performed by the nodes.

2. The method of claim 1, wherein sending at least the portion of the query to each of the plurality of engines comprises calling the plurality of engines in a pre-defined order.

3. The method of claim 2, wherein the pre-defined order is a sequential order.

4. The method of claim 1, wherein when an engine is sent the at least the portion of the query, the engine analyzes information for the query and a current status of the calculation graph to determine whether to add the node to the calculation graph.

5. The method of claim 1, wherein a first node in the calculation graph comprises a first sub-query to a first data source to retrieve a first data set from the first data source.

6. The method of claim 5, wherein a second node in the calculation graph comprises an analytical query to process the first data set.

7. The method of claim 5, wherein a second node in the calculation graph comprises a second sub-query to a second data source to retrieve a second data set from the second data source.

8. The method of claim 7, wherein:
a third node is the blend node in the calculation graph comprises an analytical query to process the first data set and the second data set, and
the analytical query blends the first data set and the second data set.

9. The method of claim 5, wherein:
the first data set is stored in storage for use by another node in performing a respective calculation.

10. The method of claim 1, wherein when performing the calculation, the node uses cached information from a prior calculation by another node.

11. The method of claim 1, wherein the output node outputs the result of the query using result sets from the other nodes of the calculation graph.

12. The method of claim 1, wherein traversing comprises determining whether any dependent nodes exist above in the calculation graph until the root node is reached.

13. A non-transitory computer-readable storage medium containing instructions, that when executed, control a computer system to be configured for:
receiving a multi-dimensional query for data in a database system, the multi-dimensional query requiring blending of data from multiple data sources;
sending at least a portion of the query to each of a plurality of engines that analyze information for the query, wherein:
at least a portion of the plurality of engines analyze the query to determine whether to add a node to a calculation graph based on a previously added node,
at least a portion of the plurality of engines add a node to the calculation graph based on analyzing of the information for the query when it is determined that a calculation by a respective engine needs to be performed, and
a node that is a blend node is added to the calculation graph when more than one data source is defined by other nodes;
determining the calculation graph generated from the at least a portion of the plurality of engines;
executing the query by calling the nodes of the calculation graph, wherein each node uses metadata added to the node from a respective engine to perform the calculation for the node, and wherein a blend node that is called blends data from more than one data source together when executed, and wherein executing comprises:
calling an output node to start processing of the query;
traversing the calculation graph from the output node to a root node, wherein when a root node is reached, the root node performs a respective calculation; and
after the root node, any dependent nodes perform respective calculations according to an order of the calculation graph until the output node is reached; and
outputting a result of the query based on the respective calculations performed by the nodes.

14. The non-transitory computer-readable storage medium of claim 13, wherein sending at least the portion of the query to each of the plurality of engines comprises calling the plurality of engines in a pre-defined order.

15. The non-transitory computer-readable storage medium of claim 13, wherein when an engine is called, the engine analyzes information for the query and a current status of the calculation graph to determine whether to add the node to the calculation graph.

16. The non-transitory computer-readable storage medium of claim 13, wherein a first node in the calculation graph comprises a first sub-query to a first data source to retrieve a first data set from the first data source.

17. The non-transitory computer-readable storage medium of claim 16, wherein:
the first data set is stored in storage for use by another node in performing a respective calculation.

18. An apparatus comprising:
one or more computer processors; and
a non-transitory computer-readable storage medium comprising instructions, that when executed, control the one or more computer processors to be configured for:
receiving a multi-dimensional query for data in a database system, the multi-dimensional query requiring blending of data from multiple data sources;
sending at least a portion of the query to each of a plurality of engines that analyze information for the query, wherein:
at least a portion of the plurality of engines analyze the query to determine whether to add a node to a calculation graph based on a previously added node,
at least a portion of the plurality of engines add a node to the calculation graph based on analyzing of the information for the query when it is determined that a calculation by a respective engine needs to be performed, and
a node that is a blend node is added to the calculation graph when more than one data source is defined by other nodes;
determining the calculation graph generated from the at least a portion of the plurality of engines;
executing the query by calling the nodes of the calculation graph, wherein each node uses metadata added to the node from a respective engine to perform the calculation for the node, and wherein a blend node that is called blends data from more than one data source together when executed, and wherein executing comprises:
calling an output node to start processing of the query;
traversing the calculation graph from the output node to a root node, wherein when a root node is reached, the root node performs a respective calculation; and
after the root node, any dependent nodes perform respective calculations according to an order of the calculation graph until the output node is reached; and
outputting a result of the query based on the respective calculations performed by the nodes.

* * * * *